Sept. 3, 1968  D. G. FAWKES  3,399,863
SKEWED AXIS BUTTERFLY VALVE FOR HIGH-PRESSURE SERVICE
Filed July 13, 1965  4 Sheets-Sheet 1

Inventor:
Donald G. Fawkes
By: Hofgren, Wegner, Allen,
Stellman & McCord
Attorneys

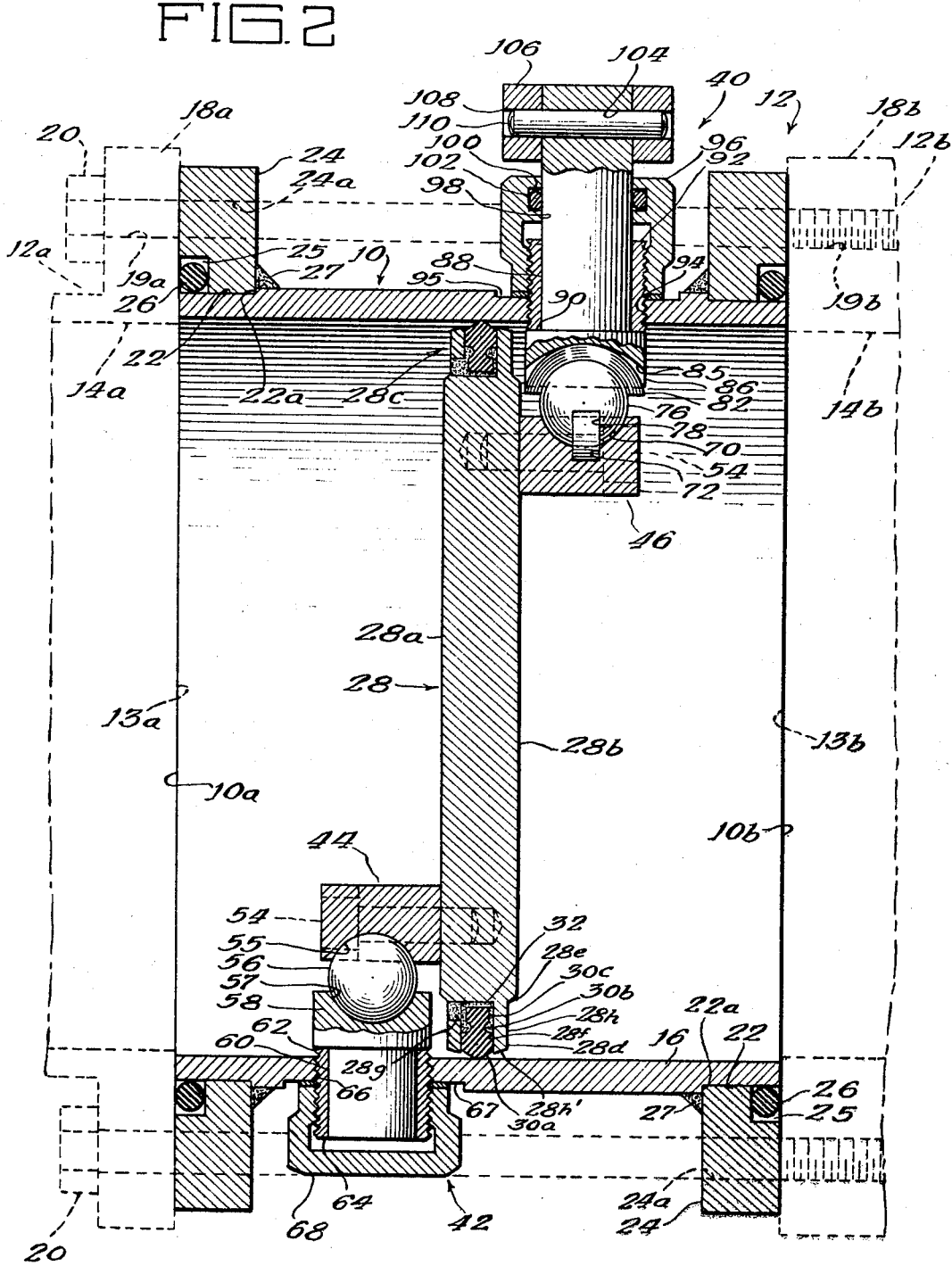

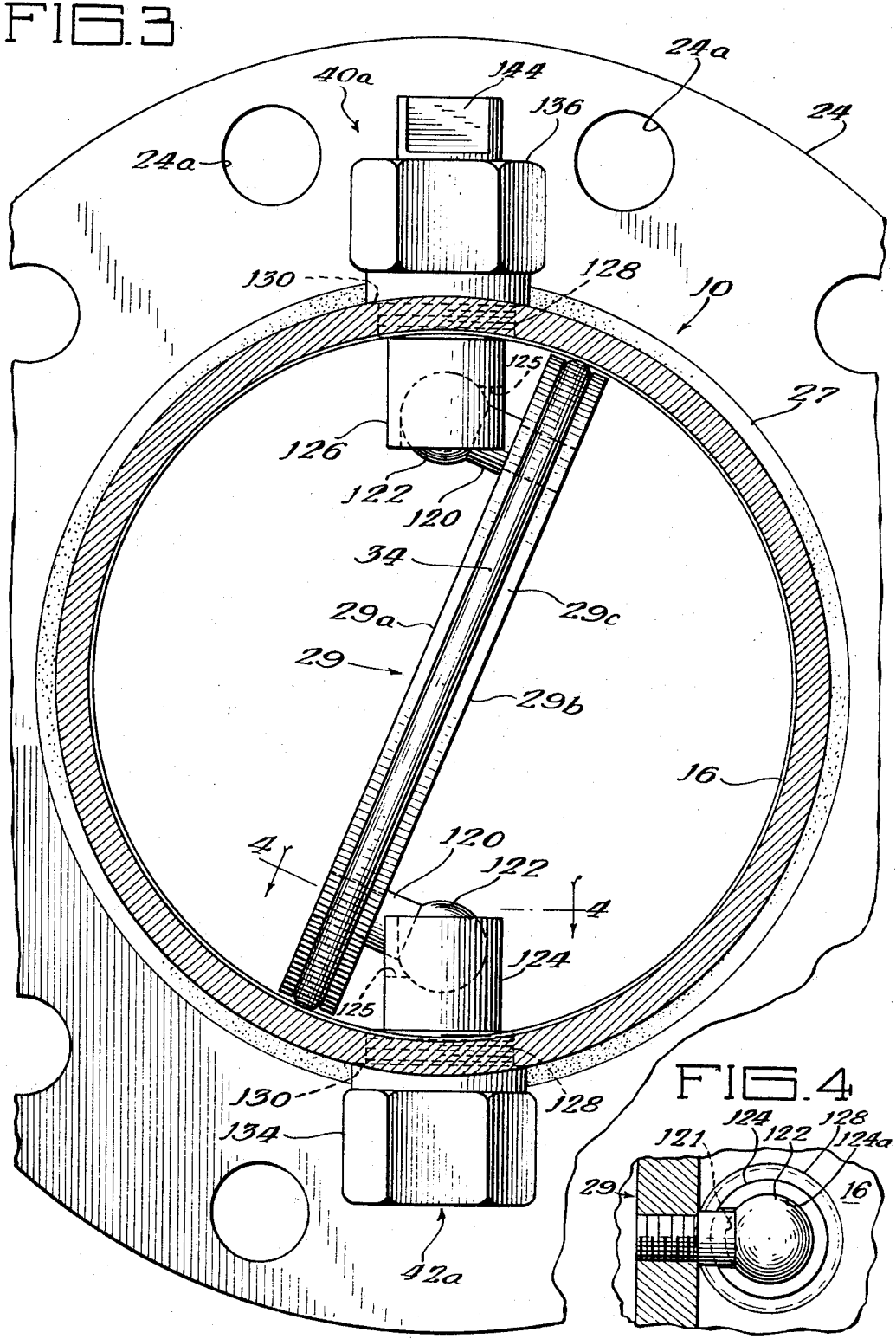

Sept. 3, 1968     D. G. FAWKES     3,399,863
SKEWED AXIS BUTTERFLY VALVE FOR HIGH-PRESSURE SERVICE
Filed July 13, 1965     4 Sheets-Sheet 4
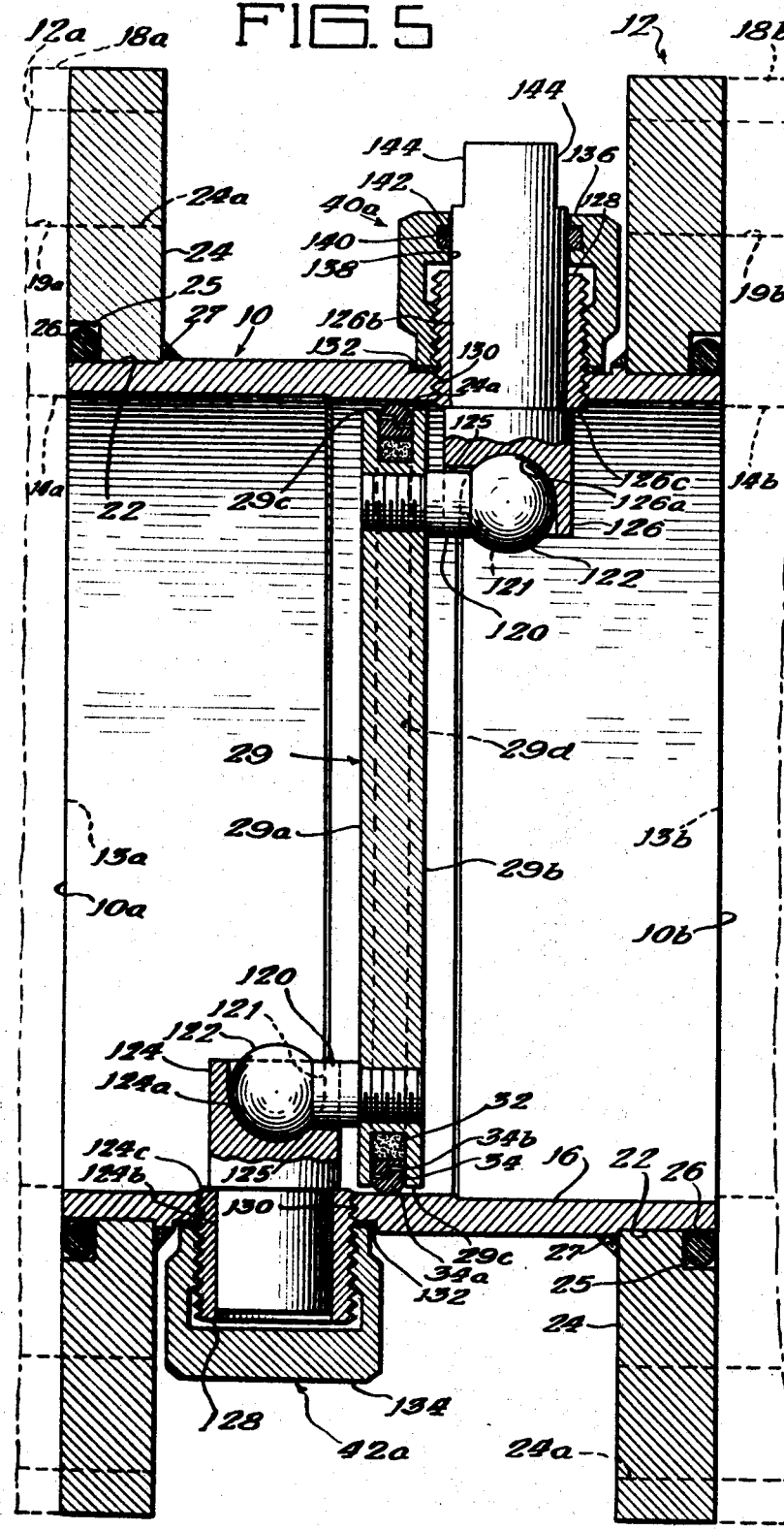
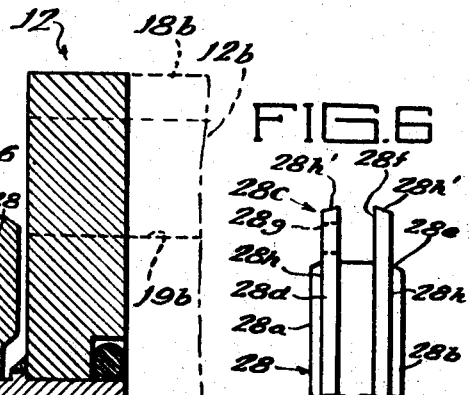
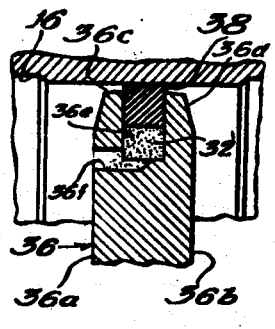
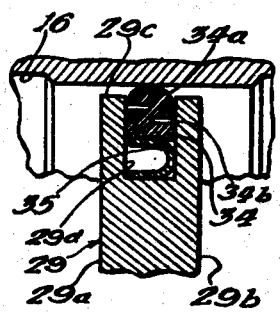

United States Patent Office 3,399,863
Patented Sept. 3, 1968

3,399,863
SKEWED AXIS BUTTERFLY VALVE FOR HIGH-PRESSURE SERVICE
Donald G. Fawkes, Chicago, Ill., assignor to Henry Pratt Company, a corporation of Illinois
Filed July 13, 1965, Ser. No. 471,583
19 Claims. (Cl. 251—306)

ABSTRACT OF THE DISCLOSURE

A butterfly valve for high-pressure service having a resilient sealing ring retained in a groove in the periphery of the valve disc by a body of plastic set in situ in the bottom of the groove with the plastic defining means locking the plastic in the groove.

---

This invention relates to valves and more particularly to a new and improved skewed axis butterfly valve for high-pressure service.

In typical butterfly valve construction, the valve disc is mounted for rotation about an axis which is generally transverse to the axis of the valve body. The periphery of the disc seals against a mating seating surface formed in the wall of the valve body. Typically a resilient seal has been provided in a recess formed in the valve body to insure the sealing engagement between the valve disc and the valve body. The accurate formation and seating of a resilient seal within the valve body has been a relatively expensive task, the cost of which is justified by the several desirable features of butterfly valves. Previous efforts at placing the resilient seal on the periphery of the valve disc, instead of in the valve housing, were relatively unsuccessful because the tendency of the periphery of the valve disc to "wipe" across the surfaces of the valve body as the disc moved to the closed position would pull the resilient seal away from the periphery of the valve disc. Moreover, the inability to properly seat the resilient seal in the periphery of the valve disc was another previously encountered problem.

It is a general object of this invention to provide a new and improved butterfly valve for high-pressure service.

It is a primary object of this invention to provide a new and improved butterfly valve wherein the resilient sealing ring is mounted in the periphery of the valve disc.

Another object of this invention is to provide a new and improved butterfly valve wherein the valve disc is mounted for movement between the open and closed position by means which minimizes the contact between the periphery of the valve disc and the interior of the valve body except in the fully closed position.

A further object of this invention is to provide a new and improved butterfly valve wherein the sealing ring is mounted in the periphery of the valve disc by means which permits the adjustment of the resilient sealing ring after the assembly of the sealing ring in the periphery of the disc to insure proper seating of the disc relative to the housing.

Other objects, features and advantages of the present invention will be apparent from the following description of the preferred embodiments illustrated in the accompanying drawings, in which:

FIGURE 2 is a longitudinal section view taken along the line 2—2 of FIGURE 1 showing the butterfly valve in position in a pipe line, the remaining pipe line components shown in dotted outline;

FIGURE 3 is a vertical section view of a modified form of a butterfly valve of this invention showing the valve disc in the fully open position;

FIGURE 4 is a fragmentary section view of the mounting of the valve disc to the mounting shaft taken along the line 4—4 of FIGURE 3;

FIGURE 5 is a longitudinal section view of the valve body shown in FIGURE 3, with the pipe line components in which the valve body is mounted shown in dotted outline;

FIGURE 6 is a fragmentary elevational view of a portion of the periphery of the valve disc shown in FIGURES 1 and 2;

FIGURE 7 is a fragmentary elevational view of a portion of the periphery of the valve disc shown in FIGURES 3 and 5; and FIGURE 8 is a fragmentary sectional view of the periphery of a third form of a valve disc which may be used with this invention.

Figure 1:
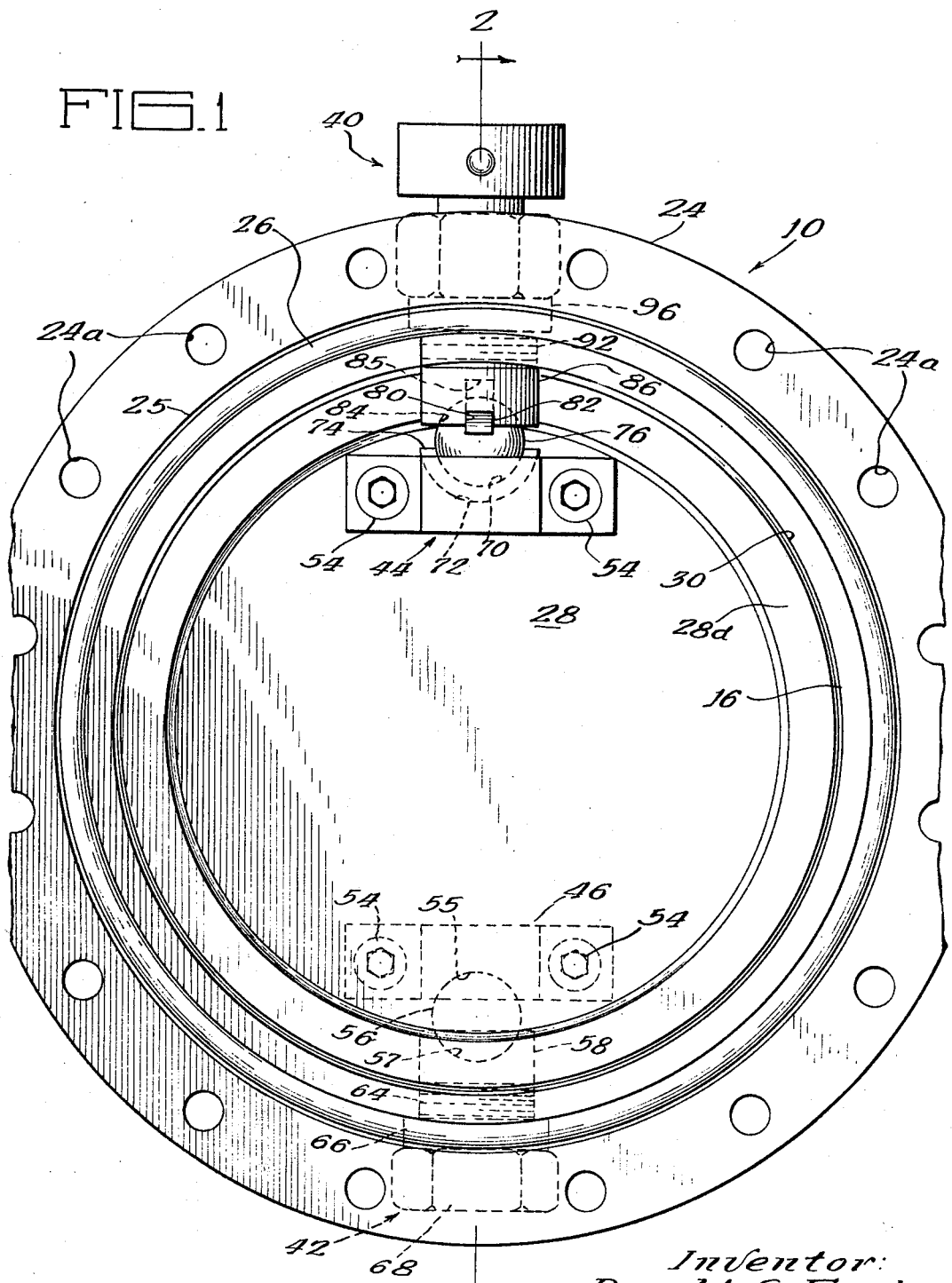
FIGURE 1 is an end elevational view of a butterfly valve embodying this invention and showing the valve disc in fully closed position.

The butterfly valve 10 of this invention is a generally circular cylindrical metallic body having, in the preferred embodiment, substantially planar parallel ends 10a and 10b. The valve is intended for use in a pipe line 12 comprising pipes 12a and 12b which also preferably have planar parallel end portions 13a and 13b, respectively. The pipes 12a and 12b have substantially hollow configurations providing passages 14a and 14b, respectively, and the valve body is similarly provided with a preferably circular cylindrical inner interior passage 16 so that a continuous flow passage is provided when the valve body is coupled into the pipe line.

Each pipe 12a and 12b may be further provided with flanges such as 18a and 18b, respectively, with openings 19a and 19b, respectively, formed in each of the flanges. Fastening means, such as a bolt 20, may be used to couple the pipe lines and valve bodies together as a unit. If desired, one of the openings, such as 19b, may be threaded for receiving the threaded end of the bolt 20.

Each end of the outer periphery of the valve body is provided with a circumferential groove 22 terminating in a radially upstanding shoulder 22a. An L-shaped retaining ring 24 is telescoped over the valve body and abuts the shoulder 22a. The retaining ring 24 may be provided with openings 24a for receiving the shank of the bolt 20. The outwardly facing L-shaped ring and periphery of the valve body form a resilient sealing ring cavity 25 in which an O-ring is positioned to seal the juncture between the valve body and the pipe line. To secure the retaining ring on the exterior of the valve housing, the ring may be welded as at 27.

The valve disc 28, shown in FIGURES 1 and 2, is provided with two substantially flat faces 28a and 28b and a generally circular periphery 28c. Near the periphery each face is reduced in thickness as at 28d forming a shoulder 28e. The valve disc periphery is grooved at 28f. Each face of the valve disc is provided with a passage 28g in the reduced thickness portion 28b which extends into the bottom of the groove 28f. The grooved configuration of the reduced thickness peripheral portion of the disc actually forms two substantially parallel radially directed, disc-like rings 28h, the outermost surface of each ring being inclined outwardly toward the center of the disc as at 28h'.

The valve disc 29 shown in FIGURES 3 and 5 is similar to the valve disc 28 and is also provided with two substantially flat faces 29a and 29b and a generally circular periphery 29c. The periphery is notched as at 29d.

Valve disc 28 is provided with a peripheral resilient 360° sealing ring 30 which is received in the groove 28f. This seal may be made of a hard rubber or "Teflon" or any other material suitable for this purpose. The sealing ring has a width which substantially spans the groove 28f. The configuration of the outer periphery 30a of this particular ring is generally a wide-angle, V-shape, in cross section. The sealing ring 30 is generally ring-like in configuration having indentations 30b in each face, and is reduced in thickness as at 30c in that portion which is radially inwardly from the indentations 30b. When the sealing ring is mounted in the periphery of the valve disc, the inner periphery of the ring is spaced from the bottom of the groove in the valve disc. The indentations in the faces of the ring and the reduced thickness portion are spaced inwardly from the sides of the groove.

Means are provided for adjusting the seating of the sealing ring in the periphery of the valve disc after the ring has been assembled in the disc to provide a proper permanent seating of the sealing ring relative both to the disc and the valve body. In FIGURES 1 and 2, this means is shown as a flowable plastic mass 32 which may be fed under pressure through one opening 28g in the disc face and flow around the indentations and reduced thickness portion of the sealing ring and into the bottom space of the groove. A preferable substance for use as this flowable plastic mass is an epoxy resin. The proper seating of the resilient sealing can be most accurately determined when the valve is finally assembled. It is not until that time that the plastic mass 32 need be fed into the space in the notch. It can be readily seen that the extent to which the sealing ring 30 extends outwardly from the groove may be governed by the amount of and pressure upon the plastic 32 which is fed into the groove. Thus, while all the components are assembled, the seating of the ring may be accurately controlled by feeding the flowable mass 32 into the space behind the sealing ring while observing the expansion of the ring outwardly into sealing engagement with the inner walls of the valve body. The mass 32 is then allowed to harden, thereby permanently locating the sealing ring relative to the valve disc and valve body.

The sealing ring 34 shown in use in FIGURES 3 and 5 also is of a width to generally span the groove 29d in the periphery of the valve disc 29. This ring is provided with a round edge 34a and is further provided with radially spaced, outwardly extending, circumferential grooves 34b in the opposite faces thereof. These grooves tend to provide a flexing action to the sealing ring 34 as the disc moves into and out of sealing position. Means are provided behind the sealing ring 34 in the grooves 29d to urge the sealing ring outwardly into proper sealing relation with the interior of the valve body. This means may also be a plastic, flowable mass or may be a resilient, generally U-shaped, spring 35 (FIGURE 7).

Yet another form of the peripheral configuration of the valve disc of this invention is shown in FIGURE 8. Disc 36 is similarly provided with opposite flat faces 36a and 36b and a generally circular peripheral edge 36c. Peripheral edge 36c is circumferentially grooved at 36e, and two or more openings 36f extend from the faces of the valve disc into the groove. Sealing ring 38, used in the disc 36, is substantially rectangular in configuration so as to have a generally flat facial engagement with the interior of the valve body. Here the plastic mass 32' may be forced into the space between the sealing ring and the bottom of the notch 36e through the opening 36f in a manner similar to that shown and described with respect to the sealing ring 30 and disc 28.

In the embodiment shown in FIGURE 8, the ring 38 may be made of "Teflon" or some similar material having little resilience or deformability. In such a case, the mass 32' may be of a compound which is relatively resilient when it sets during exposure to air. One example of such a compound would be Silastic product known as "RTV" which is fluid until exposed to air which causes the compound to set. After setting, it acquires properties similar to rubber. Though this embodiment still employs an inner plastic mass and an outer ring, the properties of the elements are reversed from those of the other embodiments in that the outer ring 38 is relatively hard and the mass 32' becomes the resilient element.

The use of the "Teflon" outer ring has been found most desirable in valves wherein the fluid passing therethrough may be relatively corrosive in nature or may be at elevated temperatures. To mount the "Teflon" ring in groove 36e, the ring must be pried over the peripheral edge 36c in a manner similar to that for mounted vehicular tires to their respective rims.

Means 40 are provided for mounting the valve discs shown in this invention for rotation through a generally spherical path between an upright closed position wherein the valve disc is in peripheral engagement with the inner walls of the valve body and mounted substantially perpendicular to the axis of the valve body, and a fully open position as shown in FIGURE 3 wherein the valve disc is skewed relative to the axis of the disc in the closed position. Included in this means are brackets 44 and 46 which are mounted to the opposite faces 28a and 28b, respectively, of the valve disc 28 by suitable means, such as bolts 54.

The bracket 44 at the lower end of the valve disc is provided with a spherical depression or ball socket 55 for receiving ball 56, which, in turn, is mounted in ball socket 57 of stub shaft 58. Stub shaft 58 has a reduced shank 60 forming a shoulder 62 and is received in a threaded bearing sleeve 64 which is threaded through the threaded opening 66 formed in the valve body in the area of flat portion 67. Threaded cap nut 68 is threaded over the bearing sleeve 64 locking and sealing against a gasket against the valve body. The shoulder 62 bears against one end of the bearing sleeve so that the extent to which the stub shaft 58 projects radially inwardly into the valve body is determined by the extent to which the bearing sleeve is threaded through the valve body.

The bracket 46 at the top of the valve disc is provided with a spherical depression or tie ball socket 70. This socket 70 is provided with an arcuate keyway 72 in which socket key 74 is positioned. Ball 76 is received in the socket 70 and notch 78 of the ball embraces key 74. The ball 76 is further provided with a diametrically opposite notch 80 which is generally perpendicular to the notch 78, and an arcuate stub shaft socket key 82 is positioned therein. This key is received in an arcuate notch 84 in stub shaft ball socket 85 of stub shaft 86.

Stub shaft 86 is similarly provided with a reduced thickness shank 88, forming a shoulder 90, and is received in a threaded bearing 92 which is threaded through opening 94 formed in the opposite side of the valve body in the areea of peripheral flat portion 95. The center line of the stub shafts 86 and 58 as well as the valve body openings 66 and 94 are parallel and substantially diametrically opposite but are laterally offset relative to each other.

To secure and seal the bearing sleeve in the valve body opening, a cap nut 96 is provided against a gasket. Cap nut 96 is also provided with a sleeve-like bore 98 for embracing the shank 88 of stub shaft 86. Stub shaft 86 is longer than stub shaft 58 so as to provide a portion which may be externally actuated to rotate the shaft and therefore turn the valve between the open and closed positions. For accommodating this, the sleeve-like bore 98 of the nut cap 96 opens to the exterior to permit the shank of the shaft to extend therethrough. Means are provided for sealing about the periphery of the shank of the stub shaft 86, including a generally circumferential groove 100 formed in the bore 98 and an O-ring 102 which is positioned in the groove.

A generally transverse opening 104 is formed near the outer end of the stub shaft, and an operator nut 106 is mounted on the end of the shaft. Operator nut 106 has aligned openings 108 and a cross pin 110 extends through the aligned openings 108 and the openings 104 to fix the operator nut on the stub shaft.

In FIGURES 3 and 5, a slightly modified means 40a and 42a are shown for mounting the valve disc 29 in the valve body. Studs 120 are threaded into the opposite faces of the valve disc. These studs have generally ball-shaped ends 122 which are in sockets 124a and 126a of stub shafts 124 and 126, respectively, which are substantially at right angle to the studs 120.

Each stub shaft is notched at 125 adjacent the studs 120 to facilitate the positioning of the stud and its end. The stub shafts 124 and 126 have a reduced shank portion 124b and 126b, respectively, which form shoulders 124c and 126c respectively. The shank portions of the aforementioned stub shafts extend into threaded bearing sleeves 128 which are threaded into threaded openings 130 formed on opposite sides of the valve body.

The openings 130 are formed at diametrically opposite but laterally spaced portions of the valve body which have flat surfaces such as 132. Cap nut 134 is provided for securing the bearing sleeve in the valve body. The cap nut 134 is provided with a bore 138 at a size to embrace the shank 126b of stub shaft 126. The bore 138 opens through the top of the cap nut to permit the stub shaft to project therethrough. For sealing the periphery of the stub shaft shank 126b, an O-ring groove is formed in bore 138 and an O-ring 142 is positioned therein. In three quadrants, the O-ring is confined by the groove 140 and in a fourth quadrant, the O-ring bears against the shank 126b. The outermost projecting portion of the shank 126b may be provided with wrench flats 144 to provide a surface for grasping with a suitable tool to apply rotational force to the stub shaft.

This invention provides a butterfly valve wherein the resilient seal is positioned in the periphery of the valve disc. Moreover, the resilient seal is mounted in the periphery of the valve disc by means which permits the accurate seating of the seal relative to the valve body at the time of final assembly of the valve components. Furthermore, the specific mounting arrangements of the valve disc for movement through a spherical path aid in maintaining the resilient seal in the periphery of the disc because contact between the resilient seal and the valve body is kept to a minimum except when the disc is in the fully closed position.

The foregoing detailed description has been given for clearness of understanding only, and no unnecessary limitations should be understood therefrom, as some modifications may be obvious to those skilled in the art.

I claim:

1. A butterfly valve for high-pressure service, comprising: a valve body having an outer periphery and an inner periphery defining a fluid passage therethrough; a valve disc having a front and rear face and peripheral edge, said valve disc mounted in said valve body for rotation between a closed position wherein the periphery of the disc is in sealing engagement with the inner periphery of the fluid passage and an open position wherein portions of the periphery of the disc are spaced from the inner periphery of the passage; an annular groove in the periphery of the valve disc having a bottom and two opposed sides, at least one of said sides having an opening therein for providing communication to the interior of the groove; a resilient sealing ring in said groove, said ring having an outer periphery projecting outwardly from the open end of said annular groove and an inner periphery spaced from the bottom of said groove; and means in the space between the inner periphery of the ring and the bottom of the groove for urging the resilient sealing ring outwardly of the groove comprising a set plastic initially flowable which was injected into the space to between the ring and the bottom of the groove through the opening formed in the side of the groove to expand the ring to the desired diameter after the valve is assembled, and said set plastic permanently positioning the ring for sealing engagement with the valve body when the valve disc is in the closed position, said set plastic mass having a portion in said opening defining means for locking said plastic mass in said groove.

2. A butterfly valve for high-pressure service, comprising: a hollow valve body having an outer periphery and an inner periphery defining a fluid passage therethrough; a valve disc having opposite sides and an annular periphery, said disc being rotatably mounted in said valve body passage for movement between an open and closed position; and means in said valve body for mounting said valve disc for rotation including a pair of offset, axially parallel stub shafts rotatably mounted in said valve body with the axes thereof intersecting the axis of the fluid passage, each shaft having a ball socket in the inner end thereof with a ball in said socket, and a ball socket provided on opposite sides of the valve disc and adjacent diametrically opposite portions of said disc periphery for receiving each ball to mount the disc for movement between the closed position wherein the disc is substantially perpendicular to the axis of the fluid passage and the open position wherein the disc is skewed to the plane defined by the axis of the fluid passage and said axes of said stub shafts responsive to rotation of one of said stub shafts.

3. Valve structure comprising: a valve member defining a channel having an outer opening, substantially parallel planar side walls adjacent said outer opening, and a bottom surface; a resiliently distortable sealing member having an outer seat portion exposed outwardly of said channel and an inner portion received in said channel, said inner portion having a width no greater than the width of said channel between said side walls; a body of plastic material set in situ in said channel adjacent said bottom surface; at least one of said planar side walls being interrupted and said plastic body having a complementary portion interlocking with the interrupted side wall for retaining said plastic body in said channel against radially outward movement; and means mechanically interlocking said sealing member and said set plastic body whereby said sealing member is retained in said channel against radially outward movement.

4. The valve structure of claim 3 wherein said inner portion of the sealing member has a width less than the width of said channel between said side walls.

5. The valve structure of claim 3 wherein said inner portion is spaced from said bottom surface.

6. The valve structure of claim 3 wherein said outer seat portion has an uncompresserd width at least equal to the width of said channel between said side walls whereby said outer seat portion effectively closes said outer opening of the channel.

7. The valve structure of claim 3 wherein said sealing member is formed of rubber.

8. The valve structure of claim 3 wherein said plastic material comprises an epoxy resin.

9. The valve structure of claim 3 wherein said side walls are substantially planar from said opening to said bottom surface.

10. A butterfly valve for high-pressure service, comprising: a valve body having an outer periphery and an inner periphery defining a fluid passage therethrough; a valve disc having a front and rear face and peripheral edge, said valve disc mounted in said valve body for rotation between a closed position wherein the periphery of the disc is in sealing engagement with the inner periphery of the fluid passage and an open position wherein portions of the periphery of the disc are spaced from the inner periphery of the passage; an annular groove in the periphery of the valve disc having a bottom and two opposed sides, at least one of said sides having an opening therein for providing communication to the interior of the groove; a resilient sealing ring in said groove, said ring having an outer periphery projecting outwardly from the open end of said annular groove and an inner periphery spaced from the bottom of said groove; and means in the space between the inner periphery of the ring and the bottom of the groove for urging the resilient sealing ring outwardly of the groove comprising a set plastic initially flowable which was injected into the space to between the ring and the bottom of the groove through the opening formed in the side of the groove to expand the ring to the desired diameter after the valve is assembled, and said set plastic permanently positioning the ring for sealing engagement with the valve body when the valve disc is in the closed position, said resilient ring having opposite faces and a substantially rounded outer periphery and being provided with radially spaced annular grooves opening through said opposite faces thereof.

11. A butterfly valve for high-pressure service, comprising: a valve body having an outer periphery and an inner peripheray defining a fluid passage therethrough; a valve disc having a front and rear face and peripheral edge, said valve disc mounted in said valve body for rotation between a closed position wherein the periphery of the disc is in sealing engagement with the inner periphery of the fluid passage and an open position wherein portions of the periphery of the disc are spaced from the inner periphery of the passage; an annular groove in the periphery of the valve disc having a bottom and two opposed sides, at least one of said sides having an opening therein for providing communication to the interior of the groove; a resilient sealing ring in said groove, said ring having an outer periphery projecting outwardly from the open end of said annular groove and an inner periphery spaced from the bottom of said groove; and means in the space between the inner periphery of the ring and the bottom of the groove for urging the resilient sealing ring outwardly of the groove comprising a set plastic initially flowable which was injected into the space between the ring and the bottom of the groove through the opening formed in the side of the groove to expand the ring to the desired diameter after the valve is assembled, and said set plastic permanently positioning the ring for sealing engagement with the valve body when the valve disc is in the closed position, said resilient sealing ring being substantially rectangular in cross section, said annular groove having a radial depth in excess of the radial depth of the sealing ring and said set plastic being resilient and urging the resilient ring radially outwardly of the groove.

12. A butterfly valve for high-pressure service, comprising: a valve body having an outer periphery and an inner periphery defining a fluid passage therethrough; a valve disc having a front and rear face and peripheral edge, said valve disc mounted in said valve body for rotation between a closed position wherein the periphery of the disc is in sealing engagement with the inner periphery of the fluid passage and an open position wherein portions of the periphery of the disc are spaced from the inner periphery of the passage; an annular groove in the periphery of the valve disc having a bottom and two opposed sides, at least one of said sides having an opening therein for providing communication to the interior of the groove; a resilient sealing ring in said groove, said ring having an outer periphery projecting outwardly from the open end of said annular groove and an inner periphery spaced from the bottom of said groove; and means in the space between the inner periphery of the ring and the bottom of the groove for urging the resilient sealing ring outwardly of the groove comprising a set plastic initially flowable which was injected into the space between the ring and the bottom of the groove through the opening formed in the side of the groove to expand the ring to the desired diameter after the valve is assembled, and said set plastic permanently positioning the ring for sealing engagement with the valve body when the valve disc is in the closed position, said resilient sealing ring having an outwardly projecting, wide-angle V-shaped outer peripheral portion and being provided with radial faces and circumferential grooves in the flat faces and the ring being reduced in cross section in the portion spaced radially inwardly from the grooves relative to its said peripheral portion so that the plastic material may flow into the space between the reduced thickness section of the sealing ring and the sides of the groove as well as in the space between the inner portion of the ring and the bottom of the groove.

13. A butterfly vave for high-pressure service, comprising: a valve body having an outer periphery and an inner periphery defining a fluid passage therethrough; a valve disc having a front and rear face and peripheral edge, said valve disc mounted in said valve body for rotation between a closed position wherein the periphery of the disc is in sealing engagement with the inner periphery of the fluid passage and an open position wherein portions of the periphery of the disc are spaced from the inner periphery of the passage; an annular groove in the periphery of the valve disc having a bottom and two opposed sides, at least one of said sides having an opening therein for providing communication to the interior of the groove; a resilient sealing ring in said groove, said ring having an outer periphery projecting outwardly from the open end of said annular groove and an inner periphery spaced from the bottom of said goove; and means in the space between the inner periphery of the ring and the bottom of the groove for urging the resilient sealing ring outwardly of the groove comprising a set plastic initially flowable which was injected into the space between the ring and the bottom of the groove through the opening formed in the side of the groove to expand the ring to the desired diameter after the valve is assembled, and said set plastic permanently positioning the ring for sealing engagement with the valve body when the valve disc is in the closed position, said groove in the periphery of the disc having radially extending side walls and the resilient ring having mating side walls engaging the groove adjacent said open end of the groove.

14. A butterfly valve for high-pressure service, comprising: a hollow valve body having an outer periphery and an inner periphery defining a fluid passage therethrough; a valve disc rotatably mounted in said valve body passage for movement between an open and closed position; and means in said valve body for mounting said valve disc for rotation including a pair of stub shafts rotatably mounted in said valve body, each shaft having a ball socket in the inner end thereof with a ball in said socket and a ball socket formed on opposite sides of the valve disc for receiving each ball to mount the disc for limited spherical movement responsive to rotation of one of said stub shafts, one of said stub shafts projecting outwardly from said valve body for external actuation thereof to move the valve disc between open and closed positions, said one stub shaft being keyed to the ball mounted in the socket therein and wherein said keyed ball is further keyed to the socket in said valve disc.

15. The butterfly valve of claim 14 wherein said stub shaft and valve disc keys are positioned generally transverse to each other.

16. Valve structure comprising: a valve member defining a channel having an outer opening, substantially parallel planar side walls adjacent said outer opening, and a bottom surface; a resiliently distortable sealing member having an outer seat portion exposed outwardly of said channel and an inner portion received in said channel, said inner portion having a width no greater than the width of said channel between said side walls; a body of set pastic material retained in said channel adjacent said bottom surface; and means mechanically interlocking said sealing member and said set plastic body, said interlocking means comprising a groove in said inner portion of the sealing member opening toward a side wall of said channel.

17. Valve structure comprising: a valve member defining a channel having an outer opening, substantially parallel planar side walls adjacent said outer opening, and a bottom surface; a resiliently distortable sealing member having an outer seat portion exposed outwardly of said channel and an inner portion received in said channel, said inner portion having a width no greater than the width of said channel between said side walls; a body of set plastic material retained in said channel adjacent said bottom surface; and means mechanically interlocking said sealing member and said set plastic body, said interlocking means comprising oppositely facing grooves in said inner portion of the sealing member opening toward said side walls of said channel.

18. Valve structure comprising: a valve member defining a channel having an outer opening, substantially parallel planar side walls adjacent said outer opening, and a bottom surface; a resiliently distortable sealing member having an outer seat portion exposed outwardly of said channel an an inner portion received in said channel, said inner portion having a width no greater than the width of said channel between said side walls; a body of set plastic material retained in said channel adjacent said bottom surface; and means mechanically interlocking said sealing member and said set plastic body, the thickest portion of said sealing member as measured in a direction parallel to said side walls away from said bottom surface being disposed substantialy midway between said side walls.

19. Valve structure comprising: a valve member defining a channel having an outer opening, substantially parallel planar side walls adjacent said outer opening, and a bottom surface; a resiliently distortable sealing member having an outer seat portion exposed outwardly of said channel and an inner portion received in said channel, said inner portion having a width no greater than the width of said channel between said side walls; a body of set plastic material retained in said channel adjacent said bottom surface; and means mechanically interlocking said sealing member and said set plastic body, said seat portion extending approximately one-half the height of the sealing member as measured in a direction parallel to said side walls away from said bottom surface.

References Cited

UNITED STATES PATENTS

| | | | |
|---|---|---|---|
| 2,083,154 | 6/1937 | Kinzie et al. | 251—307 |
| 3,144,040 | 8/1964 | White | 251—307 |
| 3,233,861 | 2/1966 | Stillwagon | 251—148 |
| 2,245,654 | 4/1966 | Henrion | 251—307 |
| 3,304,050 | 2/1967 | Fawkes | 251—306 |

M. CARY NELSON, *Primary Examiner.*

R. C. MILLER, *Assistant Examiner.*